(12) United States Patent
Montcalm

(10) Patent No.: US 10,462,023 B1
(45) Date of Patent: Oct. 29, 2019

(54) COMMUNICATION METHOD AND SYSTEM INCLUDING BUILT-IN SELF TEST

(71) Applicant: Mitel Networks Corporation, Ottawa (CA)

(72) Inventor: Michael Ross Montcalm, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 0 days.

(21) Appl. No.: 16/013,736

(22) Filed: Jun. 20, 2018

(51) Int. Cl.
*H04L 12/26* (2006.01)

(52) U.S. Cl.
CPC ........ *H04L 43/065* (2013.01); *H04L 43/0894* (2013.01)

(58) Field of Classification Search
CPC ............................ H04L 43/065; H04L 43/0894
USPC ......... 370/352–356, 389, 400–411, 241–251
See application file for complete search history.

(56) References Cited

U.S. PATENT DOCUMENTS

| | | | | |
|---|---|---|---|---|
| 7,242,944 B1 * | 7/2007 | Mangal | .................. | H04W 24/00 370/247 |
| 8,139,515 B2 * | 3/2012 | Bourque | ........... | H04L 29/12339 370/312 |
| 8,327,432 B2 * | 12/2012 | Wong | .................. | H04L 63/1433 726/12 |
| 8,539,065 B2 * | 9/2013 | Bangalore | ........... | H04L 65/1069 370/350 |
| 9,179,308 B2 * | 11/2015 | Raleigh | ............ | G06Q 10/06375 |
| 2002/0010679 A1 * | 1/2002 | Felsher | ................. | G06F 19/328 705/51 |
| 2007/0282959 A1 * | 12/2007 | Stern | ...................... | G06Q 30/02 709/206 |
| 2008/0037518 A1 * | 2/2008 | Kumarasamy | ...... | H04L 65/1069 370/352 |
| 2009/0175434 A1 * | 7/2009 | Becker | .................. | H04M 1/725 379/220.01 |
| 2010/0165862 A1 * | 7/2010 | Nylander | ................ | H04L 41/12 370/252 |
| 2010/0217837 A1 * | 8/2010 | Ansari | .................... | G06Q 30/04 709/218 |
| 2012/0307983 A1 * | 12/2012 | Faulkner | ................. | H04L 43/50 379/29.03 |
| 2015/0074259 A1 * | 3/2015 | Ansari | .................... | H04L 67/02 709/224 |
| 2015/0347683 A1 * | 12/2015 | Ansari | .................... | H04L 63/08 726/7 |
| 2017/0059687 A1 * | 3/2017 | Dinesh | .................. | G01S 5/0252 |
| 2017/0344703 A1 * | 11/2017 | Ansari | ............... | H04L 63/0876 |
| 2018/0219959 A1 * | 8/2018 | Bugenhagen | ....... | H04L 41/0823 |

* cited by examiner

*Primary Examiner* — Thai D Hoang

(57) ABSTRACT

A method and system for automatically generating and sending a test message to one or more apparatus associated with a user are disclosed. The test messages can be pushed to the one or more apparatus and a response received from the one or more apparatus prior to connecting a communication between two devices.

20 Claims, 4 Drawing Sheets

COMMUNICATION METHOD AND SYSTEM INCLUDING BUILT-IN SELF TEST

FIELD OF THE INVENTION

The present disclosure generally relates to electronic communication methods and systems. More particularly, the disclosure relates to electronic communication methods and systems capable of automatically sending self-test communications and/or responses to self-test communications.

BACKGROUND OF THE DISCLOSURE

Customer support communications, such as phone calls, chat sessions and the like, often involve an agent asking a list of preliminary questions in an effort to determine a cause of an issue. At the beginning of the communication, the agent will generally not have any idea of what the issues are, and so may begin the communication with initial questions that may be relatively general and based on, for example, the most-common type of problems encountered and/or types of problems that are relatively easy to resolve. The agent may then ask the customer to perform certain tasks before proceeding to a next level of questions.

For customers who have rarer issues and/or issues that are more difficult to resolve, or for customers who have already done the basic troubleshooting themselves, reviewing the initial questions and/or performing the initial troubleshooting steps may be unnecessarily time consuming and frustrating. Accordingly, improved methods and systems for troubleshooting and/or resolving problems are desired.

Any discussion of problems provided in this section has been included in this disclosure solely for the purposes of providing a context for the present invention, and should not be taken as an admission that any or all of the discussion was known at the time the invention was made.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF EXEMPLARY EMBODIMENTS

The description of exemplary embodiments of the present invention provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As set forth in more detail below, exemplary embodiments of the disclosure relate to electronic communication systems and methods that include an automatic self test prior to transferring or connecting a communication between a first device and a second device. The systems and methods can further include transferring a response and/or information corresponding to the response to the second device upon transferring or connecting the communication. This provides information to a user of the second device upon receipt of the communication, which allows the user to, for example, resolve issues in a relatively efficient manner. While the ways in which the present disclosure addresses various drawbacks of prior systems and methods are described in more detail below, in general, various systems and methods described herein can automatically detect issues, present information to an agent and/or automatically take other action, thereby saving a user/customer, as well as the support provider, time.

Figure 1:
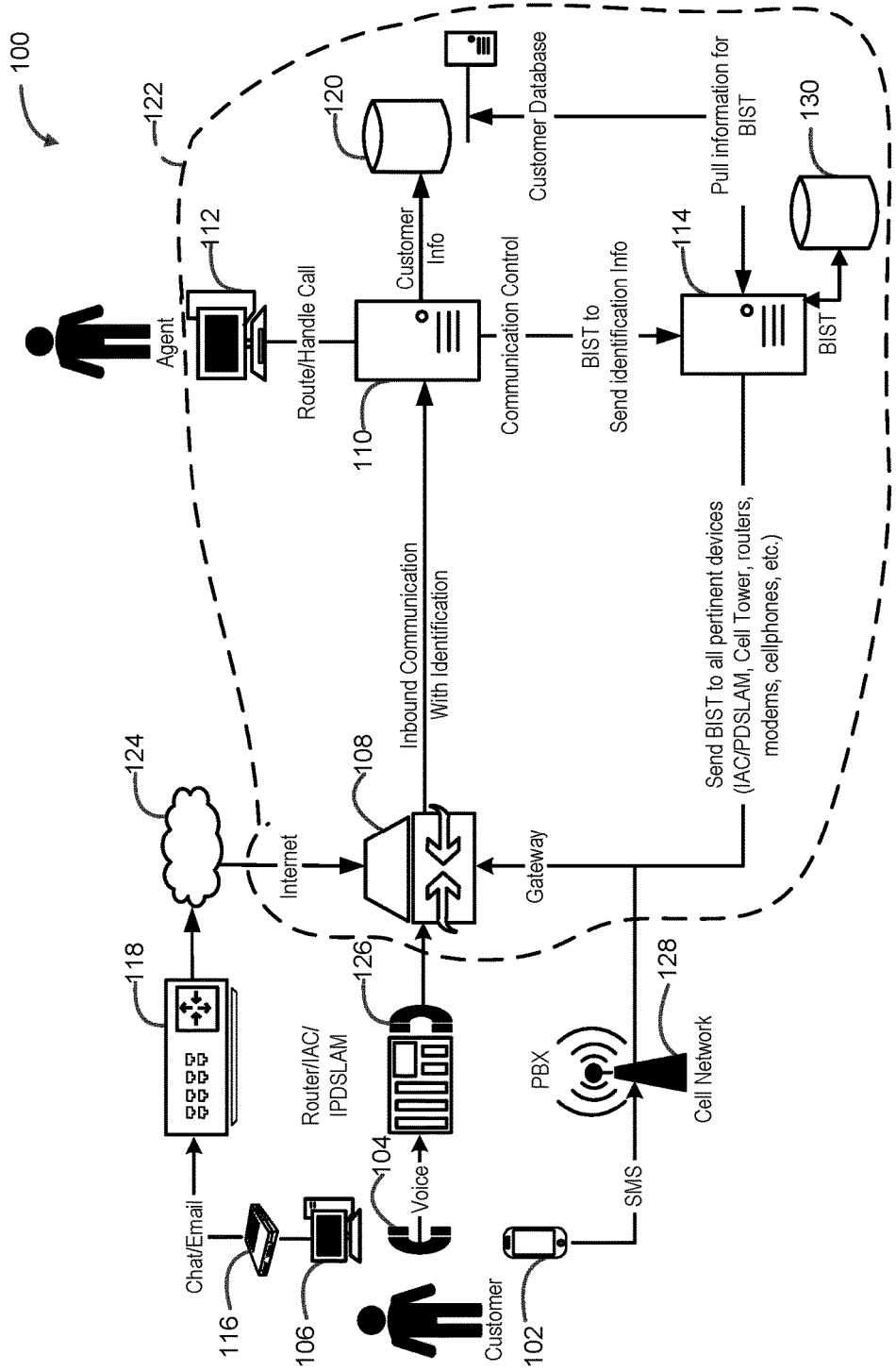
FIG. 1 illustrates an electronic communication system in accordance with exemplary embodiments of the disclosure.

Turning now to the figures, FIG. 1 illustrates an electronic communication system 100 in accordance with exemplary embodiments of the disclosure. Electronic communication system 100 includes one or more first devices 102, 104, 106; a communication gateway 108 that receives a communication from one or more of first user devices 102, 104, 106; a communication controller 110, coupled to communication gateway 108, that receives the communication from communication gateway 108 and that routes the communication to one or more second user devices 112; and a self-test server 114 configured to send one or more test messages to one or more apparatus (e.g., a modem 116 and/or a router 118) associated with a user of the first device. Apparatus associated with a user can also include one or more first devices 102, 104, 106. In the illustrated example, system 100 also includes a customer database 120 and a device database 130.

System 100 can be used to automatically perform one or more self tests on one or more apparatus (e.g., one or more of first devices 102-106, modem 116, and/or router 118) as a communication is initiated from first device 102, 104, 106 to second device 112 within a network 122. The results of the self test(s) can be presented to a user of second device 112 upon connection of the communication or shortly thereafter.

First devices 102, 104, 106 and/or second device 112 can be or include any suitable device with wired or wireless communication features that can connect to gateway 108. For example, first devices 102, 104, 106 and second device 112 can be or include a wearable device, a tablet computer, a wired phone, a mobile phone, a personal (e.g., laptop or desktop) computer, a streaming device, such as a game console or other media streaming device, or the like. One or more of first and second devices 102, 104, 106, 112 can include an application or client (generally referred to herein as application) to perform various functions set forth herein and/or to cause to be displayed text and/or other information as described herein. For example, device 112 can include an application that includes a user interface to display test results upon connection of a communication between first device 102, 104, 106 and second device 112.

System 100 can include various networks and/or other routers to allow one or more first devices 102, 104, 106 to couple to gateway 108. For example, system 100 can include a network 124 to allow one or more devices 102, 104, 106 to communicate with gateway 108. Network 124 (and/or network 122) can be, for example, an internet protocol (IP) network. Exemplary types of networks suitable for communication network 124 or network 122 include a local area network, a wide-area network, a metropolitan area network, wireless networks, or the Internet. Various components of network 124, 122 can be coupled to one or more other components using an Ethernet connection, other wired connections, and/or wireless interfaces. Network 124, 122 can be coupled to other networks and/or to other devices typically coupled to networks. By way of particular example, network 124 can include the Internet and network 122 includes a communication network and network 124, 122 can be coupled to additional networks (not illustrated) that can be coupled to one or more of devices 102, 104, 106. Additionally or alternatively, system 100 can also include a private branch exchange (PBX) 126. PBX 126 can couple devices 102, 104, 106 to gateway 108 using Public Switched Telephone Network (PSTN) or can use internet protocol (IP) to couple devices 102, 104, 106 to gateway 108. Further, as illustrated, system 100 can additionally or alternatively include a cellular or mobile network 128 to allow one or more of devices 102, 104, 106 to couple to gateway 108.

Gateway 108 can include any suitable apparatus that allows data to flow from, for example, network 124, PBX 126 and/or cell network 128 to communication controller 110 within network 122. By way of example, gateway 108 includes a Mitel Border Gateway (MBG) device.

Communication controller 110 can be or include, for example, a media gateway controller that performs various functions of communication controller 110 as described herein. An example could be a server operating Mitel MiContact Centre (MiCC) software. Additionally, one or more PBXs, such as a Mitel MiVoice Business PBX, can be used to balance incoming communications if the communication volume is high. For example, system 100 could use four PBXs to handle, for example, 25% of call traffic each, all pointing at four external IVR boxes that handle the routing to agents/playing of inbound workflows.

In accordance with exemplary embodiments of the disclosure, communication controller 110 routes communications from one or more first devices 102, 104, 106 to one or more second devices 112 and sends user identification information (e.g., obtained by communication controller 110 during a call setup) to self-test server 114. Communication controller 110 can also cause user information, including user identification information and/or user device information, to be stored in customer database 120. Each incoming communication to communication controller 110 can be checked for an identifier, and if no identifier is found, communication controller 110 and/or customer database 120 can assign a unique case identifier associated with the communication.

As noted above, communication controller 110 can include interactive voice response (IVR), which allows communication controller 110 to interact with a user of one or more first devices 102106 prior to connecting second user device 112 to the communication. By way of examples, the IVR can be used to collect user identification information, information regarding the issue, or the like. Dual-tone multi-frequency signaling decoding, speech recognition, and/or text can be received by communication controller 110/IVR from one or more first devices 102, 104, 106 in response to information the first devices 102106 receive from communication controller 110/IVR. Any responses received from communication controller 110 can be forwarded to second device 112 when the communication is connected between first device 102, 104, or 106 and second device 112 and/or to customer database 120 if such information was used to identify apparatus associated with a user. By way of example, communication controller 110 and/or the IVR can request a user to identify whether the communication is regarding a support request. Upon receipt of the communication from the first device or upon notification that the communication is or relates to a request for support, an automatic number identification can be used to automatically generate user identification information. The customer identification can then be checked, using communication controller 110, to see if customer database 120 includes information corresponding to the user identification information. If corresponding information is found, communication controller 110 then sends self-test server 114 a message to initiate a test message to one or more user apparatus associated with the user identification information.

Self-test server 114 can include any suitable server or computer that can perform the various self-test server 114 functions as described herein. In accordance with various embodiments of the disclosure, self-test server 114 receives a message from communication controller 110 that includes user identification and a request that a self test be run. Upon receiving the request from communication controller 110 that a self test be run, self-test server 114 sends a request to customer database 120 for a list of apparatus associated with the user identification (and optionally a device used in the communication) and/or automatically performs a device route to determine devices used to make the communication from the first device 102, 104, 106 to communication controller 110, and automatically sends a test message to one or more of the apparatus associated with the user identification and/or detected during the device route. When device information is included in the information sent to self-test server 114, self-test server 114 can initially send a test message to apparatus associated with the user identification but not associated with that particular device (because that device is apparently working well enough to initiate the communication). For example, with reference to system 100, if a phone is used over PBX 126, self-test server 114 may initially send a message to router 118, cell network 128, and/or devices 102, 104, 106. If self-test server 114 sends a message to one or more modems and receives response that the user's modem(s) are offline, self-test server 114 can then automatically send additional test messages—e.g., to query router 118 for the last known time modem 116 asked for an IP address and/or the last time any traffic was detected on a line through router 118. Self-test server 114 can push this information, as well as the result of or response to the test message, to second device 112—either when second device 112 is coupled to the communication with the first device 102, 104, 106 or thereafter. Should self-test server 114 determine via a response to the test message that the customer's modem is online, self-test server 114 can automatically send additional test messages, such as a modem speed test, or other modem health checks, and push any results to second device 112. Should an entire Line Termination (LT) card, Network Termination (NT) card, or the entire router 118 be determined as a result of a response to a test message to be offline, self-test server 114 can push an automatically-generated support ticket to the support technicians (e.g., using another device) to roll a truck to address the issue, while also pushing a message to second device 112, and/or to a device (e.g., another second device associated with a manager) to notify all agents on duty to be aware of the issue, and/or to update outage notifications listed on a provider's (e.g., a provider associated with an agent using device 112) website. In these cases, when the user is connected to an agent, the agent can either start troubleshooting, knowing at least some of the starting conditions, such as:

The user's modem is working; start troubleshooting steps at the router stage.
The modem is not working properly, so begin with a modem reset and/or other modem troubleshooting steps.

Should the issue be deeper in the network, the agent can immediately tell the customer that the issue is not on the customer end, and that there is a truck already rolling to fix the issue (as sent by an automated ticket generated by self-test server 114).

Once the apparatus along a communication route are determined, the test message is sent using self-test server 114. The type of test to be sent can be determined based upon the apparatus to be tested—for example, by retrieving the associated test information from device database 130.

For example, the inbound communication to communication controller 110 can contain an automatic number identification (ANI) with a customer's phone number (an example of identification information). The system can search customer database 120 for that phone number or other identification information, such as an email address, a device ID, an apparatus ID, an assigned customer ID (e.g., assigned by communication controller 110) or the like, to know which customer is calling. System 100 can then take appropriate action: for example, if the customer (e.g., using one of devices 102, 104, 106) is calling the support center that only has the customer listed as having a cellphone, there would not be information to test their home internet, as they may have another provider. Instead, customer database 120 will send the user's home and cell number, and self-test server 114 will send a test message for one or both of those devices and provide the result information to device 112—e.g., for an agent to review.

Self-test server 114 can send a plurality of test messages to one or more apparatus at the same time or can sequentially send test messages to one or more apparatus and await a response before sending another test message. For example, to expedite troubleshooting, self-test server 114 can send a test message to one or more of routers 118 and modems 106 associated with the user identification information, or can initially send a test message to one or more routers 118 and then to one or more modems 106 associated with the user identification information, or can send a test message to one or more modems 106 and then to one or more routers 118 associated with the user identification information.

Exemplary test messages include a basic ping of the device, a traceroute to determine how the device connects to the rest of the network and which apparatus are used to connect the devices/apparatus, various command line interface (CLI) commands specific to the brand/type of router or DSLAM/IAC/cell tower, ask for modem speed, check LT cards, check NT cards, check for alarms, system health, system uptime, and the like. Information about which test to run can be programmed or stored within self-test server 114 or stored within device database 130.

Modem 116 can include any suitable modem to transmission of a communication. By way of example, modem 116 includes a cable or digital subscriber line (DSL) modem.

Router 118 can include any apparatus that can route and/or multiplex communications (where router 118 includes multiplexing functions, router 118 can be referred to as router/multiplexer). For example, router 118 can be an internet access controller. Additionally or alternatively, router 118 can be a combination router/multiplexer. By way of particular example, when modem 116 includes a DSL modem, router 118 can include an internet protocol (IP) digital subscriber line (DSLAM) device.

Customer database 120 can include one or more computers or servers to store user information, including user identification information, user device information, and user apparatus information. Although separately illustrated, customer database 120 can form part of communication controller 110 and/or self-test server 114. Various device apparatus associated with a communication or a user can be determined during the traceroute and/or using information stored in customer database 120. If a traceroute is used, database 120 can be updated with apparatus information.

Figure 2:
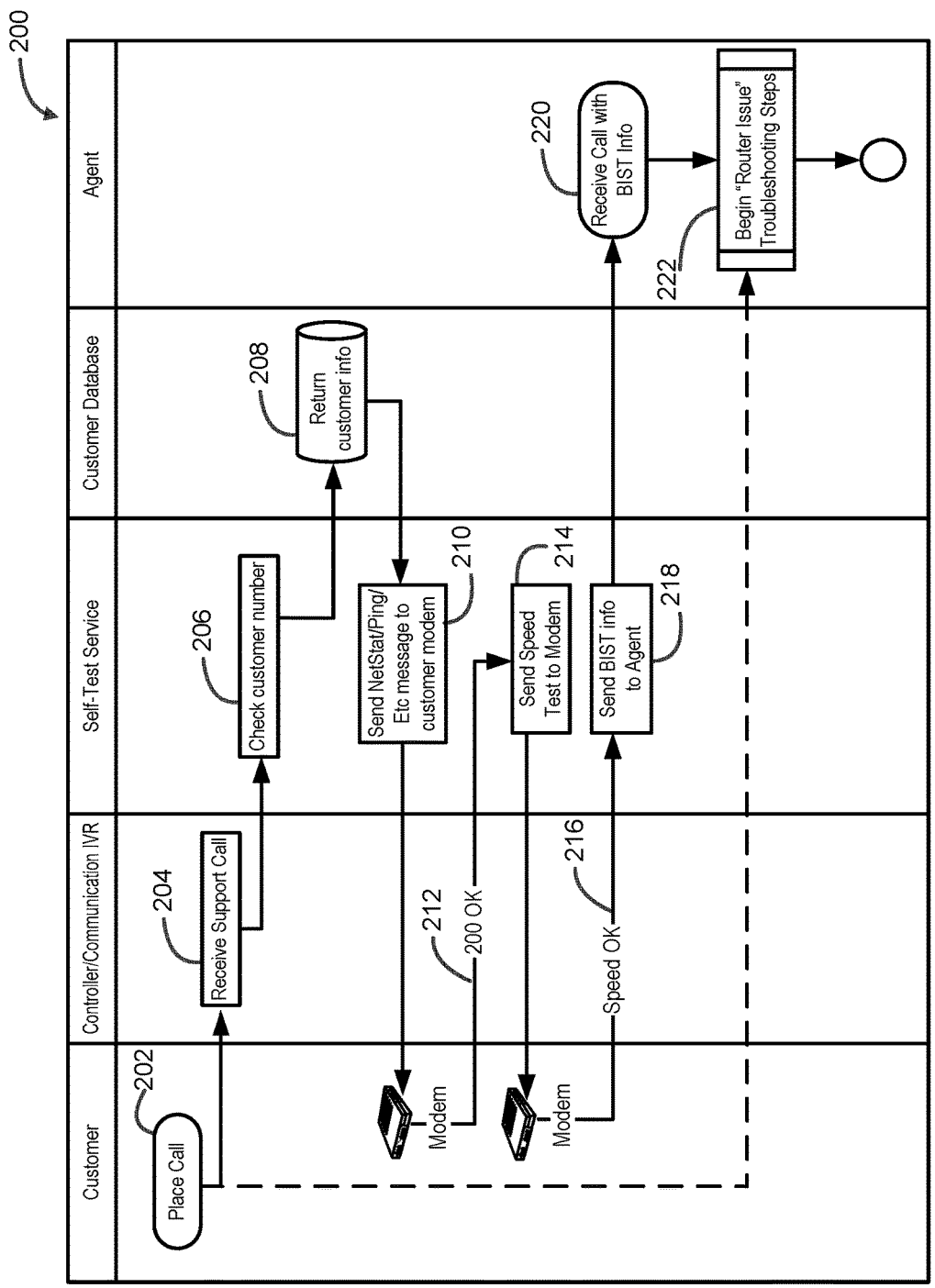
FIG. 2 illustrates a communication flow diagram in accordance with exemplary embodiments of the disclosure.
Figure 3:
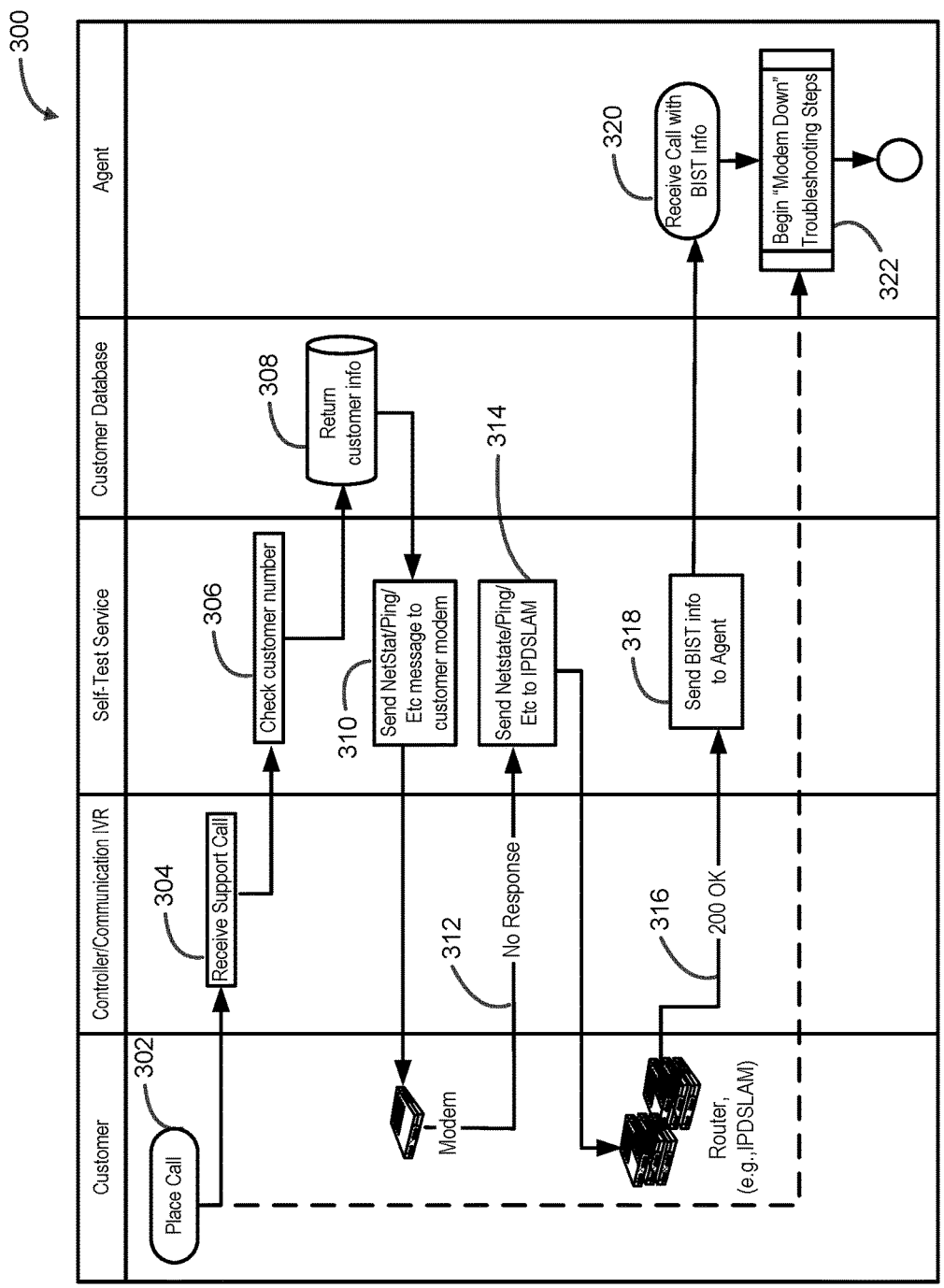
FIG. 3 illustrates another communication flow diagram in accordance with exemplary embodiments of the disclosure.
Figure 4:
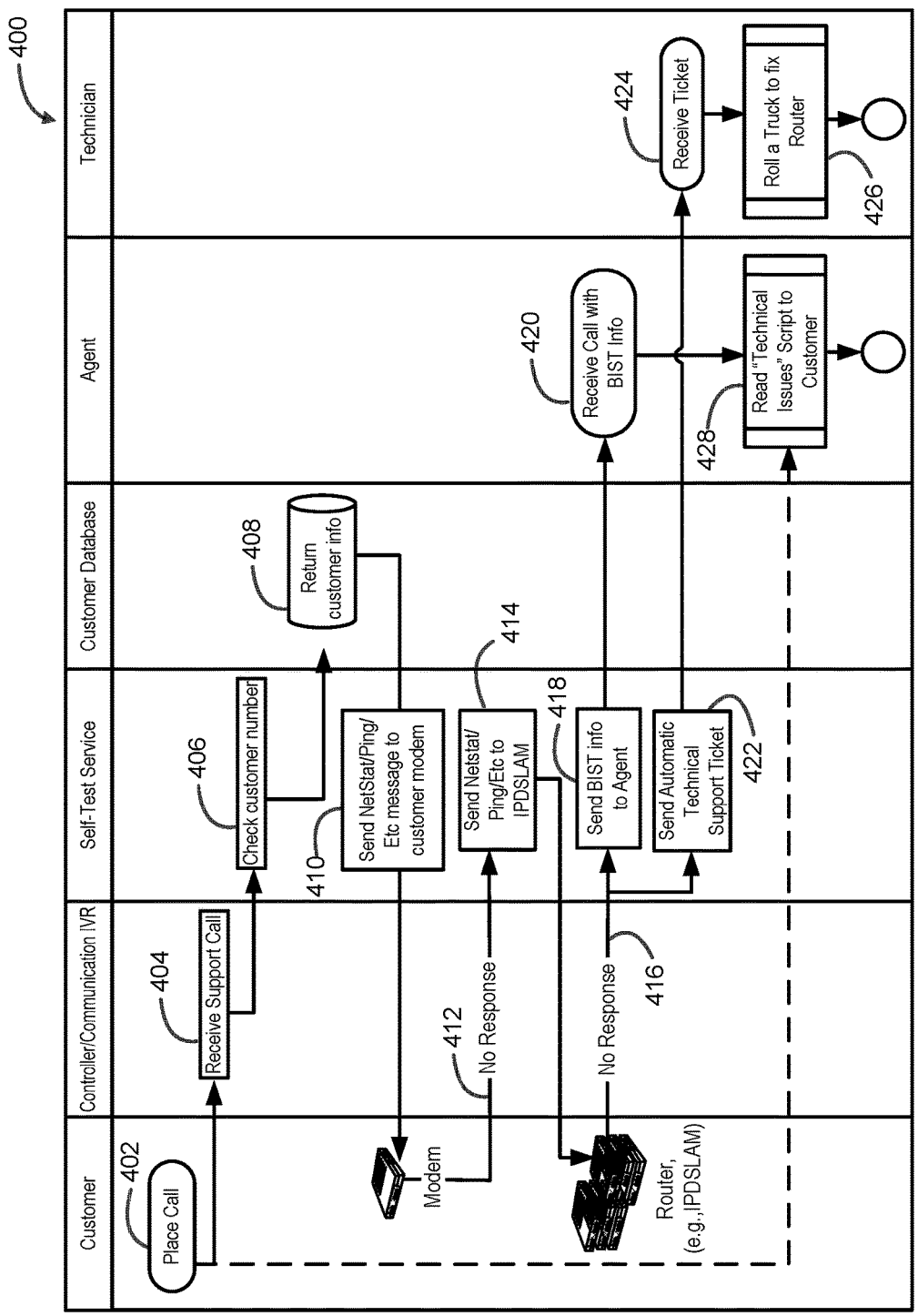
FIG. 4 illustrates yet another communication flow diagram in accordance with exemplary embodiments of the disclosure.

FIGS. 2-4 illustrate exemplary communication flow diagrams, illustrating exemplary methods in accordance with the present disclosure. The methods are illustrated in the context of troubleshooting internet service provisions; however, as noted above, unless otherwise stated, the disclosure is not limited to such illustrative examples.

FIG. 2 illustrates a method 200 for sending a test message to a user apparatus. In the illustrated example, the user apparatus includes a modem, such as modem 116. Method 200 begins with a user placing a communication (step 202)—e.g., using a device 102, 104, or 106. A communication controller (e.g., communication controller 110) receives the communication and user identification associated with a device and/or user making the communication (step 204). The communication controller or the self-test server can then check user identification information received from the first device against information stored in a customer database, such as customer database 120 (step 206). The database can return customer apparatus information and the customer identification information to the self-test server (step 208). The self-test server can then automatically send a test message to one or more apparatus of the customer apparatus information received by the customer database (step 210). In the illustrated example, the modem (customer apparatus) sends back a response message to the self-test server that the modem is okay (step 212). The self-test server can then send another test message (e.g., a speed test message) to the modem (step 214). The modem can then respond (step 216) with, for example, a "speed okay" message or upload and/or download operating speed of the modem that resulted from the test message. The modem status and speed test information can then be sent to a second device (e.g., second device 112) when the communication is connected to the second device (step 220) or thereafter and the self-test server can cause the results to be displayed on the second device—e.g., using an application on the second device. Method 200 can further include a step of troubleshooting a router (step 222), since the modem appears to be working properly.

FIG. 3 illustrates another method 300 for sending a test message to a user apparatus. Method 300 begins with a user placing a communication (step 302)—e.g., using a device 102, 104, or 106. A communication controller (e.g., communication controller 110) receives the communication and user identification associated with a device and/or user making the communication (step 304). The communication controller or the self-test server can then check user identification information received from the first device against information stored in a customer database, such as customer database 120 (step 306). The database can return customer apparatus information and the customer identification information to the self-test server (step 308). The self-test server can then automatically send a test message to one or more apparatus of the customer apparatus information received by the customer database (step 310). In the illustrated example, the modem sends back no response message to the self-test server (step 312) (e.g., a period to receive a response has timed out). The self-test server can then automatically send a test message to the router (e.g., an IPDSLAM) (step 314). The router can then respond (step 316) with, for example, a "router okay" message. The modem status and the router status information can then be sent to a second device (e.g., second device 112) when the communication is connected to the second device (step 318) or thereafter and the self-test server can cause the results to be displayed on the second device (step 320). Method 300 can further include a step of troubleshooting a modem down (step 322).

FIG. 4 illustrates another method 400 for sending a test message to a user apparatus. Similar to methods 200 and 300, method 400 begins with a user placing a communication (step 402)—e.g., using a device 102, 104, or 106. A communication controller (e.g., communication controller 110) receives the communication and user identification associated with a device and/or user making the communication (step 404). The communication controller or the self-test server can then check user identification information received from the first device against information stored in a customer database, such as customer database 120 (step 406). The database can return customer apparatus information and the customer identification information to the self-test server (step 408). The self-test server can then automatically send a test message to one or more apparatus of the customer apparatus information received by the customer database (step 410). In the illustrated example, the modem sends back no response to the self-test server that the modem (step 412) (e.g., a period to receive a response) has timed out. The self-test server can then send a test message to the router (e.g., an IPDSLAM) (step 414). In the illustrated example, the router does not respond or the self-test server receives a "no reply," e.g., no reply from the router within a specified period of time (step 416). The modem status and the router status information can then be sent to a second device (e.g., second device 112) when the communication is connected to the second device (steps 418, 420) or thereafter and the self-test server can cause the results to be displayed on the second device. The self-test server can also send (e.g., at or at about the same time as sending information to the agent) a technician support ticket (step 422). A ticket can be received by a technician (e.g., on a second device 112) (step 424) and the technician can be dispatched to investigate the issues (step 426). Method 400 can further include a step of an agent conveying the test results to the user (step 428).

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may stand alone or be combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

What is claimed is:

1. A communication system comprising:
   a first device;
   a communication gateway to receive a communication from the first device;
   a communication controller coupled to the communication gateway;
   a second device coupled to the communication controller; and
   a self-test server configured to send one or more test messages to one or more apparatus associated with a user of the first device,
   wherein the communication controller is configured to receive a communication from the first device and communicatively connect the first device and the second device,
   wherein the communication controller receives identification information corresponding to the user of the first device and transfers the identification information to the self-test server, and
   wherein, based on the identification information, the self-test server pushes a test message to the one or more apparatus before the communication is transferred from the call controller to the second device.

2. The communication system of claim 1, wherein the communication controller receives the identification information during a call setup.

3. The communication system of claim 1, wherein the one or more apparatus comprise a router/multiplexer.

4. The communication system of claim 3, wherein the one or more apparatus comprise a modem coupled to the router/multiplexer.

5. The communication system of claim 1, wherein at least one of the one or more apparatus sends a response to the test message to the communication controller, the communication controller routes the response to the self-test server, and the self-test server sends an additional test message.

6. The communication system of claim 1, wherein the identification information comprises one or more of a phone number and an email address.

7. The communication system of claim 1, wherein the communication controller comprises an automatic number identifier.

8. The communication system of claim 1, further comprising a database, wherein the self-test server queries the database to determine the one or more apparatus.

9. The communication system of claim 1, wherein the communication controller comprises interactive voice response.

10. An electronic communication method comprising the steps of:
    receiving, at a communication controller, a communication from a user using a first device;
    sending, using the communication controller, identification information corresponding to the user to a self-test server;
    using the self-test server, pulling apparatus information corresponding to the user from a database, the apparatus information comprising information for one or more apparatus;
    sending, using the self-test server, a test message to the one or more apparatus;
    receiving, using the communication controller, a response from the one or more apparatus; and after receiving the response, connecting a second device to the communication.

11. The electronic communication method of claim 10, further comprising:

after receiving a response from the one or more apparatus, sending an additional test message to another of the one or more apparatus.

12. The electronic communication method of claim 11, wherein the additional test message comprises a modem speed test.

13. The electronic communication method of claim 11, wherein the additional test message comprises a test message sent to an internet access controller.

14. The electronic communication method of claim 11, wherein the additional test message comprises a test message sent to an IPDSLAM.

15. The electronic communication method of claim 10, wherein the communication controller receives the identification information during a call setup.

16. The electronic communication method of claim 10, wherein the one or more apparatus comprise one or more of a router/multiplexer.

17. The electronic communication method of claim 10, further comprising sending result information from the self-test server to the second device.

18. The electronic communication method of claim 17, wherein the step of sending the result information is before the step of connecting.

19. The electronic communication method of claim 10, further comprising a step of sending results corresponding to the response to the second device and causing information corresponding to the results to be displayed using a user interface on the second device.

20. A communication system comprising:

a communication controller;

a second device coupled to the communication controller;

a self-test server configured to send one or more test messages to a device associated with a user of a first device; and a database comprising customer information, wherein the communication controller is configured to receive a communication from the first device and communicatively connect the first device and the second device, wherein the communication controller receives identification information corresponding to a user from the first device and transfers the identification information to the self-test server, and wherein, based on the identification information, the self-test server pushes a test message to one or more apparatus before the communication is transferred from the communication controller to the second device.

* * * * *